United States Patent [19]

Fu

[11] Patent Number: 5,752,845
[45] Date of Patent: May 19, 1998

[54] MODULAR SEAT WITH ELECTRICAL CONNECTOR

[75] Inventor: David Fu, Rochester Hills, Mich.

[73] Assignee: Lear Corporation, Southfield, Mich.

[21] Appl. No.: 705,424

[22] Filed: Aug. 29, 1996

[51] Int. Cl.⁶ .................................................. H01R 13/64
[52] U.S. Cl. ........................... 439/247; 439/381; 439/289
[58] Field of Search ................................. 439/289, 374, 439/380, 381, 247, 248

[56] References Cited

U.S. PATENT DOCUMENTS

| | | | |
|---|---|---|---|
| 3,094,364 | 6/1963 | Lingg | 439/247 |
| 4,431,242 | 2/1984 | Gisewsky | 439/289 |
| 4,710,136 | 12/1987 | Suzuki | 439/297 |
| 4,929,183 | 5/1990 | Rinneburger | 439/297 |
| 5,372,517 | 12/1994 | Levesque | 439/374 |
| 5,516,303 | 5/1996 | Yohn et al. | 439/248 |
| 5,605,150 | 2/1997 | Radons et al. | 439/248 |

Primary Examiner—P. Austin Bradley
Assistant Examiner—T C Patel
Attorney, Agent, or Firm—MacMillan, Sobanski & Todd

[57] ABSTRACT

An electrical connector assembly comprising a frame member and a first electrical connector box secured to the frame member. At least one electrically operated component is also secured to the frame member and is electrically connected to the first box. A plurality of electrical connectors are mounted within the first box. An attachment member is disposed on the frame member for attaching the frame member and the first box to a support structure. A guide member guides the first box into alignment with a complementary second electrical connector box on the support structure for establishing an electrical connection with the electrically operated component. The subject invention accordingly provides a self-aligning and self-docking electrical connector which automatically connects the electrically operated component to the support structure.

22 Claims, 8 Drawing Sheets

MODULAR SEAT WITH ELECTRICAL CONNECTOR

RELATED APPLICATION

This application claims priority to and all of the benefits of co-pending U.S. provisional patent application Ser. No. 60/007,548 which was filed on Nov. 27,1995 and is entitled "Modular Vehicle Seat Assembly." This application also claims priority to and all the benefits of co-pending U.S. provisional patent application Ser. No. 60/016,775 which was filed on May 7, 1996 and is entitled "Improved Modular Vehicle Seat Assembly".

TECHNICAL FIELD

The subject invention relates to self-aligning and self-docking electrical connectors, wherein the preferred embodiment utilizes the electrical connectors on an automotive seat assembly.

BACKGROUND OF THE INVENTION

Electrical connectors must meet a variety of design criteria. A most difficult situation presents itself where one desires to make a blind connection, preferably by robotic assistance, for a wiring harness having multiple electric connectors between male and female terminals, which accounts for manufacturing and installation assembly tolerances between the members being electrically coupled and which will accommodate vibration and consequent relative movement between these members after electrical coupling and final assembly, i.e. during use.

Such an application presents itself in addressing the challenges of providing a new modular vehicle seat assembly as described in the aforementioned related patent applications. Other applications also exist as detailed below.

Automotive front and rear seat assemblies typically include a right and left seat assembly having a seat bottom, a pivotal seat back, a seat track assembly, and a center console or arm rest assembly positioned between the right and left seat assemblies. Typically, each of the seat assembly's parts must be independently mounted in a vehicle, that is to the vehicle frame or floor pan. More specifically, the seat bottom and seat back each include a seat frame that is mounted to a pair of seat tracks. The seat tracks must then be mounted to the vehicle floor pan for each individual seat assembly. Similarly, the center console is commonly secured between the seat assemblies and mounted to the vehicle floor pan.

Many of the seat assembly's parts require an electrical connection to operate any number of electrical devices located therein. Typically, the electrical devices are mounted to the appropriate seat frame. Electrical devices commonly found within the seat assemblies may include seat adjustment mechanisms, lumbar support mechanisms, headrest adjustment mechanisms, a seat bottom heating mechanism, or other similar devices. Electrical devices commonly found within the center console or armrest assembly can include armrest adjustment mechanisms, cigarette lighters, various indicating lights, map lights, cellular phones, stereo components, or other similar devices. Each of these electrical devices has numerous input wires which are individually mounted to a terminal box. Specifically, each input wire is welded or otherwise affixed to a corresponding pin. As can be appreciated, the number of terminal boxes increases as the number of electrical devices utilized on the seat assemblies increases. The vehicle frame has corresponding terminal boxes wherein each terminal box has a number of sockets located therein. During installation, the pins must be aligned with the sockets in order to create an electrical connection. Accordingly, the installation of the seat assembly is substantially burdened when a great number of electrical devices are utilized. In other words, an installer must first correctly connect each terminal box extending from each electrical device to the corresponding terminal box on the vehicle frame. After the installer ensures that an electrical connection has been created, the particular part of the seat assembly is then installed.

SUMMARY OF THE INVENTION AND ADVANTAGES

A self-aligning and self-docking electrical connector assembly comprising a frame member and at least one electrically operated component supported by the frame member. A first electrical connector box is secured to the frame member. The electrically operated component is electrically connected to the first box. The first box may include one or more electrical connectors, each being resiliently biased in the horizontal and vertical planes to accommodate manufacturing tolerances during blind assembly and constant vibrations during use. An attachment member is disposed on the frame member for attaching the frame member and the first box to a support structure. A guide member guides the first box into alignment with a complementary second electrical connector box on the support structure having complementary guide means for the electrical connectors for establishing an electrical connection with the electrically operated component.

Accordingly, the subject invention provides a self aligning and self docking electrical connector which allows for automatically and reliably connecting the electrically operated component(s) to the support structure. One embodiment of the subject invention as detailed herein provides a self-aligning and self-docking electrical connector which automatically connects an electrically operated component(s) of a seat frame to a vehicle when a seat assembly is installed.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
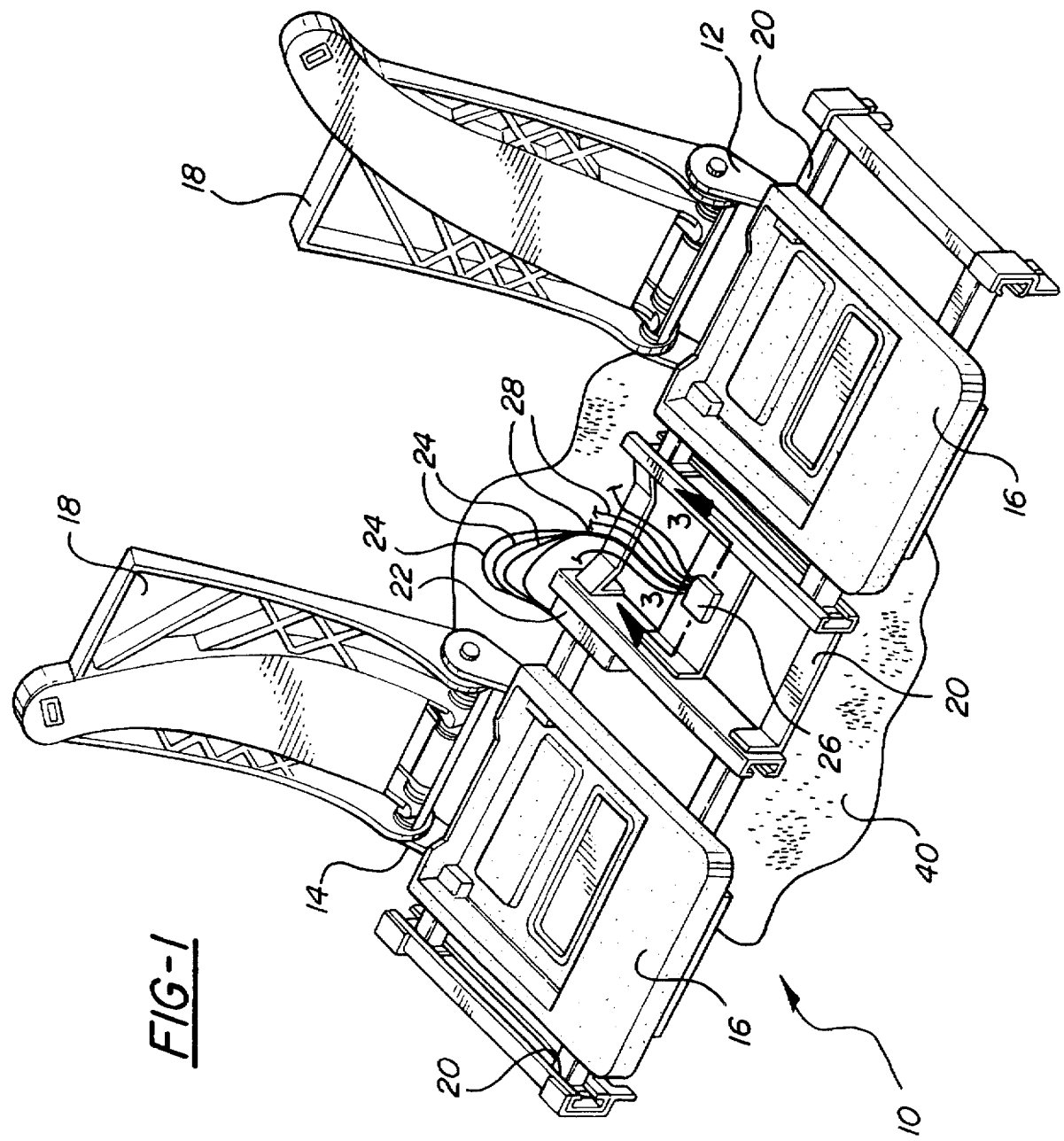
FIG. 1 is a perspective view of an automotive seat assembly and a vehicle floor pan utilizing the subject invention.

Referring to the Figures, wherein like numerals indicate like or corresponding parts throughout the several views, an automotive seat assembly is generally shown at 10. The automotive seat assembly 10 comprises a right 12 and left 14 seat assembly having a seat bottom 16, a pivotal seat back 18, and a center console assembly (not shown) positioned between the right 12 and left 14 seat assemblies. The seat bottom 16, seat back 18, and center console assembly all utilize a common frame member 20. The frame member 20 shown in FIG. 1 is an automotive seat frame 20. At least one electrically operated component 22 is supported by the seat frame 20. The electrically operated component 22 shown in FIG. 1 is a seat track adjustment mechanism. Other electrically operated components found within the seat assemblies may include seat adjustment mechanisms, lumbar support mechanisms, headrest adjustment mechanisms, a seat bottom heating mechanism, or other similar devices. There may also be electrically operated components found within the center console assembly, which can include armrest adjustment mechanisms, cigarette lighters, various indicating lights, map lights, cellular phones, stereo components, or other similar devices. Each of these electrically operated components 22 has numerous input wires 24 extending therefrom. Any number or all of these electrically operated components 22 could be supported by the frame member 20 without deviating from the scope of the subject invention.

Figure 2:
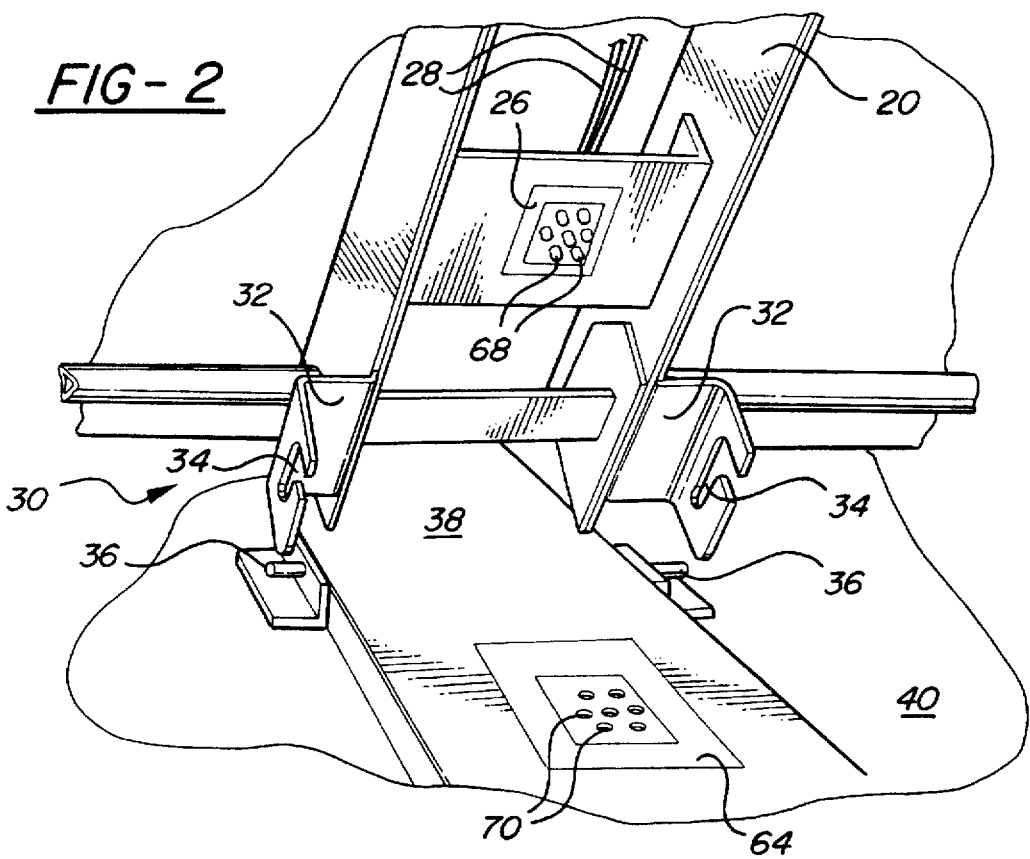
FIG. 2 is a fragmentary perspective view of the seat assembly and the floor pan.

A first electrical connector box 26 is secured to the seat frame 20. More specifically, the first box 26 is secured to the seat frame 20 underneath the center console assembly. The electrically operated component 22 is electrically connected to the first box 26. Specifically, each input wire 24 extending from the electrically operated component 22 is connected to a corresponding lead wire 28 extending from the first box 26. As can be appreciated, any number or all of the electrically operated components 22 discussed above could be connected to the first box 26 and the first box 26 could be secured to any part of the seat frame 20. An attachment member, generally depicted at 30, is mounted on the seat frame 20 for attaching the seat frame 20 and the first box 26 to a support structure. The support structure shown in FIGS. 1 through 6 is comprised of a tunnel section 38 and a vehicle floor pan 40 of a vehicle (not shown). As best shown in FIG. 2, the attachment member 30 comprises two outwardly extending brackets 32 each having an L-shaped slot 34. Specifically, the brackets 32 extend outwardly and downwardly from the seat frame 20 whereby the L-shaped slot 34 engages a locator pin 36 protruding from the tunnel section 38 of the vehicle floor pan 40. During installation of the seat assembly 10, the seat frame 20 may slide along the floor pan 40 with a range equal to the size of the L-shaped slot 34.

Figure 3:
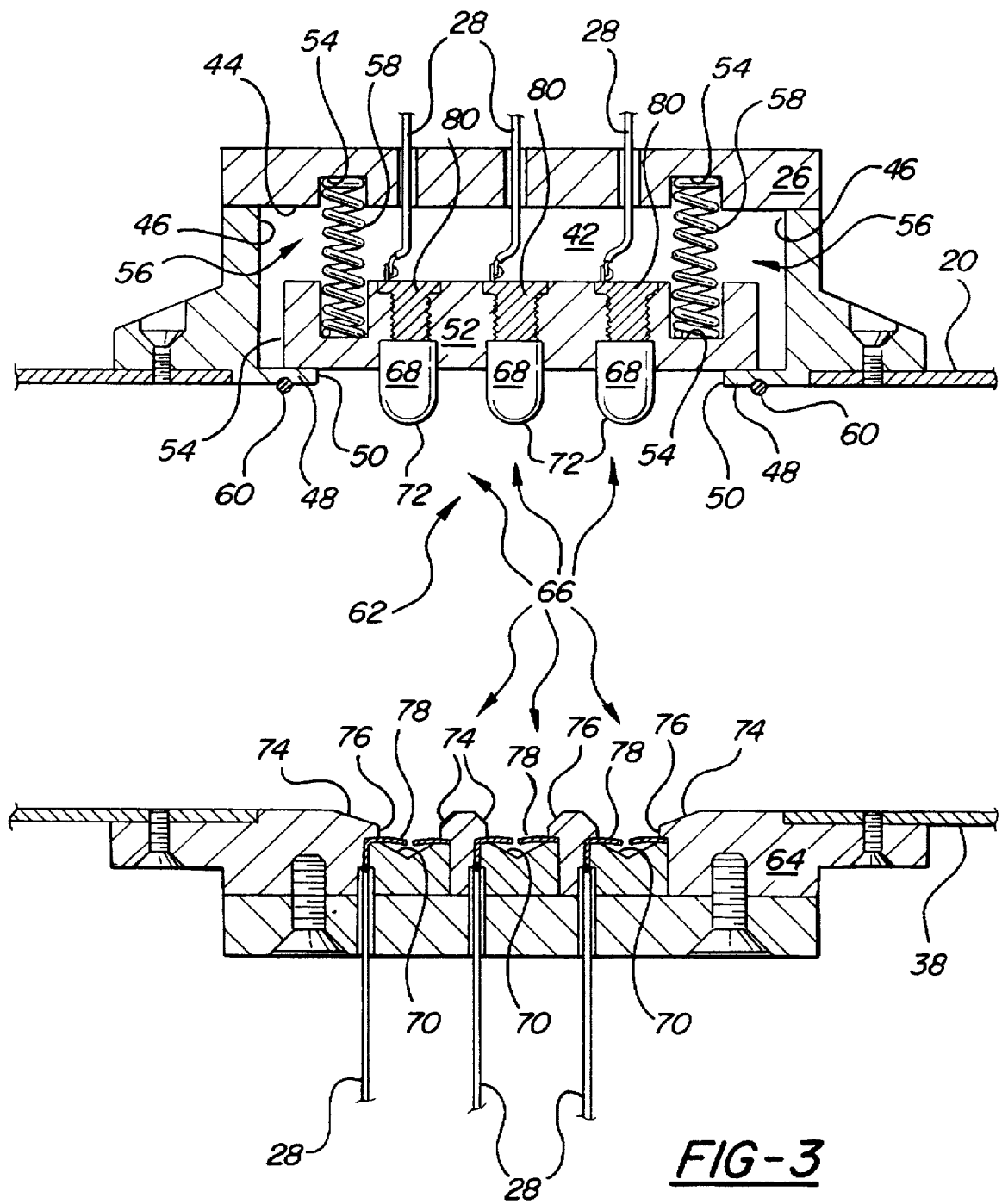
FIG. 3 is a partial cross-sectional view of a first electrical connector box and a second electrical connector box taken along line 3-3 of FIG. 1.
Figure 4:
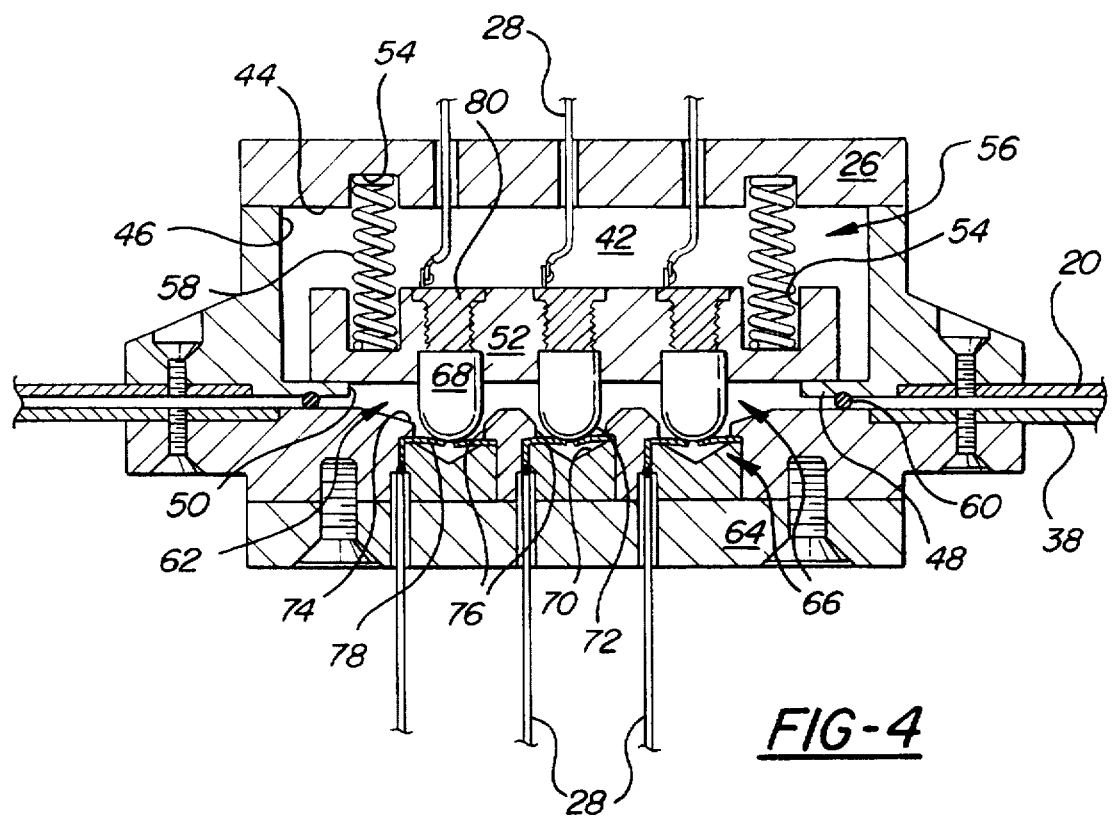
FIG. 4 is a partial cross-sectional view of the first and second boxes in an engaged position.

Referring specifically to FIGS. 3 and 4, the first box 26 includes an interior chamber 42 defined by the first box 26. The chamber 42 has a top surface 44 and a plurality of side walls 46 extending from the top surface 44 to an inwardly projecting flange 48 wherein the distal end of the flange 48 defines the circumference of an opening 50. A mounting plate 52 is disposed within the chamber 42 and supported for limited floating movement within the chamber 42 of the first box 26. The flanges 48 retain the mounting plate 52 within the chamber 42. A plurality of recessed cavities 54 are located within the top surface 44 of the chamber 42 and the mounting plate 52. A plurality of resilient elements, generally depicted at 56, supports the mounting plate 52 in the first box 26 for both lateral and in and out movement relative to the first box 26. Specifically, the resilient elements 56 are coiled springs 58 that engage the recessed cavities 54 within the top surface 44 and the mounting plate 52. The resilient elements 56, however, can be of any configuration or design so long as the mounting plate 52 is continuously biased toward the opening 50 within the first box 26 and is permitted lateral floating movement between the side walls 46. An annular seal 60 is affixed to the first box 26 and surrounds the opening 50 within the chamber 42. The space between the mounting plate 52 and side walls 46 is sufficient to allow floating, self-locating, movement accommodating the manufacturing and assembly tolerances involved. Similarly, the space between the mounting plate 52 and top surface 44 accommodates these tolerances as well as vibrations during use, and allows for the pins 68 to be fully retracted within the first box 26 to accommodate sliding the first box 26 into an electrical connection with the second box 64.

A guide member, generally shown at 62, is included for guiding the first box 26 into alignment with a complementary second electrical connector box 64 on the tunnel section 38 of the vehicle floor pan 40, which in turn establishes an electrical connection with the electrically operated component 22 within the vehicle. During installation, the guide member 62 moves the mounting plate 52 laterally for alignment with the second box 64 on the vehicle. The annular seal 60 provides sealing engagement between the first 26 and second 64 boxes.

The first box 26 also comprises of a plurality of electrical connectors, generally depicted at 66. The connectors 66 comprise at least one male 68 and female 70 element wherein the elements 68, 70 define the guide member 62. More specifically, the male elements 68 are solid pins 68 having parabolic front surfaces 72 and the female elements 70 are cylindrical recessed cavities 70. The pins 68 may be made of brass or any other electrical conducting material. The pins 68 are encased within the mounting plate 52 of the first box 26 and the recessed cavities 70 are encased within the second box 64. A cylindrical chamfer 74 extends downwardly toward a circular cylinder 76 which defines the circumference of each recessed cavity 70. The diameter of the circular cylinder 76 is only slightly larger than the diameter of the pins 68 to define a slip fit. A bendable contact plate 78 is disposed within each recessed cavity 70 directly below each circular cylinder 76. The contact plates 78 can be made of a beryllium copper alloy (BeCo) or other suitable electrical conducting material. The chamfers 74 located around the outermost perimeter of the outermost recessed cavities 70 may be larger and have a shallower slope than the chamfers 74 located between these outermost cavities 70. In other words, they might be elliptical to accommodate larger manufacturing and/or assembly tolerances along that particular axis. In any event, the length of each cavity 70 will preferably be constant and render equal docking support for all pins. The chamfers 74 facilitate a self-aligning feature and thus must be shaped to define an entrance to the cavity accommodating the manufacturing and assembly tolerances in that lateral plane and along any axis. The circular cylinders 76, given their relative diameters and length, facilitate a self-docking feature. In other words, during installation the pins 68 slide along the chamfers 74 as the seat assembly 10 is being positioned. The pins 68 then slide down the chamfers 74 and into the circular cylinders 76 which retain the pins 68 into position. Hence, the pins 68 automatically align and dock themselves within the circular cylinders 76. The parabolic front surfaces 72 of the pins 68 are now in electrical engagement with the contact plates 78 of the recessed cavities 70.

Electrical taps 80 extend into the mounting plate 52 and abut the pins 68 wherein the contact plates 78, the pins 68, and the taps 80 are all electrical conducting elements. Each contact plate 78 and tap 80 has the corresponding lead wires 28 extending therefrom. Specifically, the lead wires 28 extending from the contact plates 78 are connected to an electrical power source (not shown) and the lead wires 28 extending from the taps 80 are connected to the electrically operated component 22. Note that this arrangement could be reversed with the contact plates 78 connected to the electrically operated component 22 and the taps 80 connected to the electrical power source without deviating from the scope of the subject invention. However, the preferred design for electrical connection has the power source connected to the female element 70 or contact plate 78, and the load or electrically operated component 22 connected to the male element 68 or taps 80 and pins 68. This design prevents any inadvertent short circuiting during installation. As can be appreciated, if the power source was connected to the pins 68 on the first box 26, the pins 68 could accidentally contact a ground on the vehicle which would short circuit the power source. With the power source connected to the contact plates 78 located within the recessed cavities 70 there is only a minimal chance of an accidental short circuit.

Figure 9:
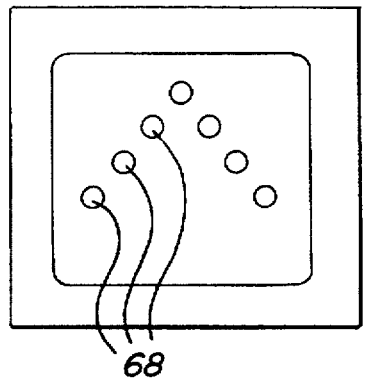
FIG. 9 is a plan view of yet another alternative configuration of the pins.
Figure 7:
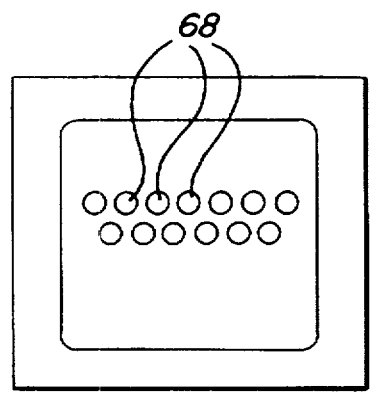
FIG. 7 is a plan view of an alternative configuration of the pins of the first box.
Figure 8:
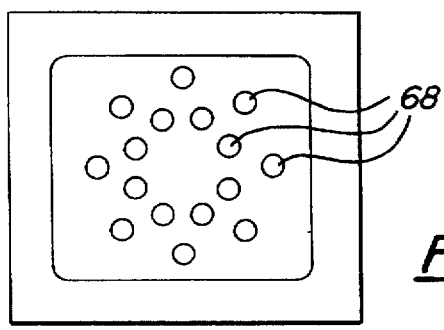
FIG. 8 is a plan view of another alternative configuration of the pins.

The male 68 and female 70 elements can be arranged in any fashion, however, experiments have shown that the best configuration is when the elements 68, 70 are generally offset from one another in a transverse direction. In other words, the elements 68, 70 are in a non-symmetric layout. Examples of non-uniform configurations are shown in the following Figures. FIG. 2 shows the pins 68 and the recessed cavities 70 arranged in three offset parallel rows and FIG. 7 shows an alternative embodiment of the pins 68 arranged in two offset parallel rows. FIG. 8 shows another alternative embodiment wherein the pins 68 are arranged in a circular matrix and FIG. 9 shows yet another alternative embodiment wherein the pins 68 are arranged in an arrowhead shape. As is apparent, the configuration of the recessed cavities 70 must conform to the exact configuration of the pins 68. Further, the optimum configuration will depend upon the installation requirements and electrical devices to be utilized.

Figure 5:
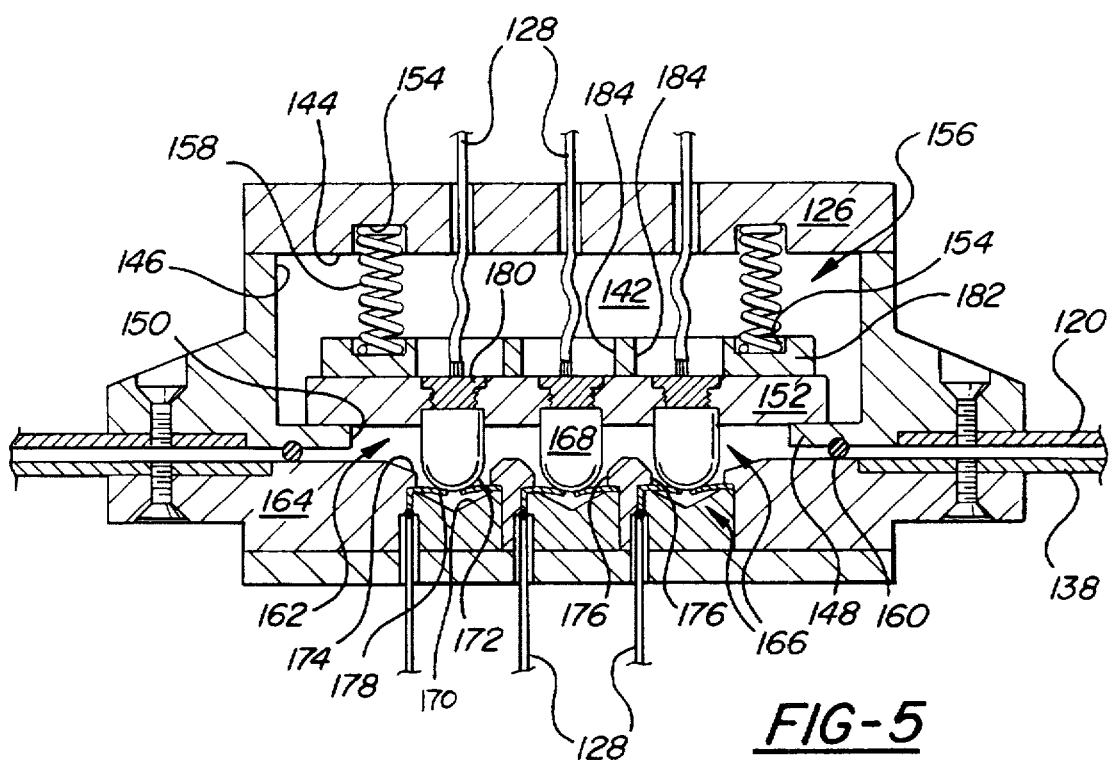
FIG. 5 is a partial cross-sectional view of an alternative embodiment of the first and second boxes.

An alternative embodiment is shown in FIG. 5 wherein like numerals increased by one hundred indicate like or corresponding parts. A first electrical connector box 126 includes an interior chamber 142 defined by the first box 126. The chamber 142 has a top surface 144 and a plurality of side walls 146 extending from the top surface 144 to an inwardly projecting flange 148 wherein the distal end of the flange 148 defines the circumference of an opening 150. A mounting plate 152 is disposed within the chamber 142 and supported for limited floating movement within the chamber 142 of the first box 126. A biasing plate 182 slidably engages the mounting plate 152 for supporting the mounting plate 152 in the first box 126. The flanges 148 abut the mounting plate 152 and retain the mounting plate 152 and biasing plate 182 within the chamber 142. A plurality of recessed cavities 154 are located within the top surface 144 of the chamber 142 and the biasing plate 182. A plurality of resilient elements, generally depicted at 156, supports the mounting plate 152 and biasing plate 180 in the first box 126 for both lateral and in and out movement relative to the first box 126. Specifically, the resilient elements 156 are coiled springs 158 that engage the recessed cavities 154 within the top surface 144 of the first box 126 and the biasing plate 184. The resilient elements 156, however, can be of any configuration or design so long as the mounting plate 152 and biasing plate 182 are continuously biased toward the opening 150 within the first box 126. An annular seal 160 is affixed to the first box 126 and surrounds the opening 150 within the chamber 142.

A guide member, generally shown at 162, is included for guiding the first box 126 into alignment with a complementary second electrical connector box 164 on a tunnel section 138 of the vehicle floor pan 40, which in turn establishes an electrical connection with the electrically operated component 22 within the vehicle. During installation, the guide member 162 moves the mounting plate 152 and biasing plate 182 laterally for alignment with the second box 164 on the vehicle. The annular seal 160 provides sealing engagement between the first 126 and second 164 boxes.

The first box 126 also comprises of a plurality of electrical connectors, generally depicted at 166. The connectors 166 comprise at least one male 168 and female 170 element wherein the elements 168, 170 define the guide member 162. More specifically, the male elements 168 are solid pins 168 having parabolic front surfaces 172 and the female elements 170 are cylindrical recessed cavities 170. The pins 168 may be made of brass or any other electrically conducting material. The pins 168 are encased within the mounting plate 152 of the first box 126 and the recessed cavities 170 are encased within the second box 164. A cylindrical chamfer 174 extends downwardly toward a circular cylinder 176 which defines the circumference of each recessed cavity 170. The diameter of the circular cylinder 176 is larger than the diameter of the pins 168. A bendable contact plate 178 is disposed within each recessed cavity 170 directly below each circular cylinder 176. The contact plates 178 can be made of a beryllium copper alloy (BeCo) or other suitable electrically conducting material. The chamfers 174 located around the perimeter of the recessed cavities 170 are larger and have a shallower slope than the chamfers 174 located between the recessed cavities 170. The chamfers 174 facilitate the self-aligning feature and the circular cylinders 176 facilitate the self docking feature. In other words, during installation the pins 168 slide along the chamfers 174 as the seat assembly 10 is being positioned. The pins 168 then slide down the chamfers 174 and into the circular cylinders 176 which retain the pins 168 into position. Hence, the pins 168 automatically align and dock themselves within the circular cylinders 176. The parabolic front surfaces 172 of the pins 168 are now in electrical engagement with the contact plates 178 of the recessed cavities 170.

Electrical taps 180 extend into the mounting plate 152 and abut the pins 168 wherein the contact plates 178, the pins 168, and the taps 180 are all electrical conducting elements. Each contact plate 178 and tap 180 has a corresponding lead wire 128 extending therefrom. A plurality of apertures 184 are defined within the biasing plate 182 wherein the lead wires 128 extend through the apertures 184 in the biasing plate 182. The mounting plate 152 slides along the biasing plate 182 having a range equal to the diameter of the apertures 184 located within the biasing plate 182. The lead wires 128 extending from the contact plates 178 are connected to an electrical power source (not shown) and the lead wires 128 extending from the taps 180 are connected to the electrically operated component 22. Note that this arrangement could be reversed with the contact plates 178 connected to the electrically operated component 22 and the taps 180 connected to the electrical power source. However, as discussed above, the preferred design for electrical connection has the power source connected to the female element 170 or contact plate 178, and the load or electrically operated component 22 connected to the male element 168 or taps 180 and pins 168. This design prevents any inadvertent short circuiting during installation. As discussed above and shown in FIGS. 2, 7, 8, and 9 the male 168 and female 170 elements can be arranged in any fashion.

Figure 6:
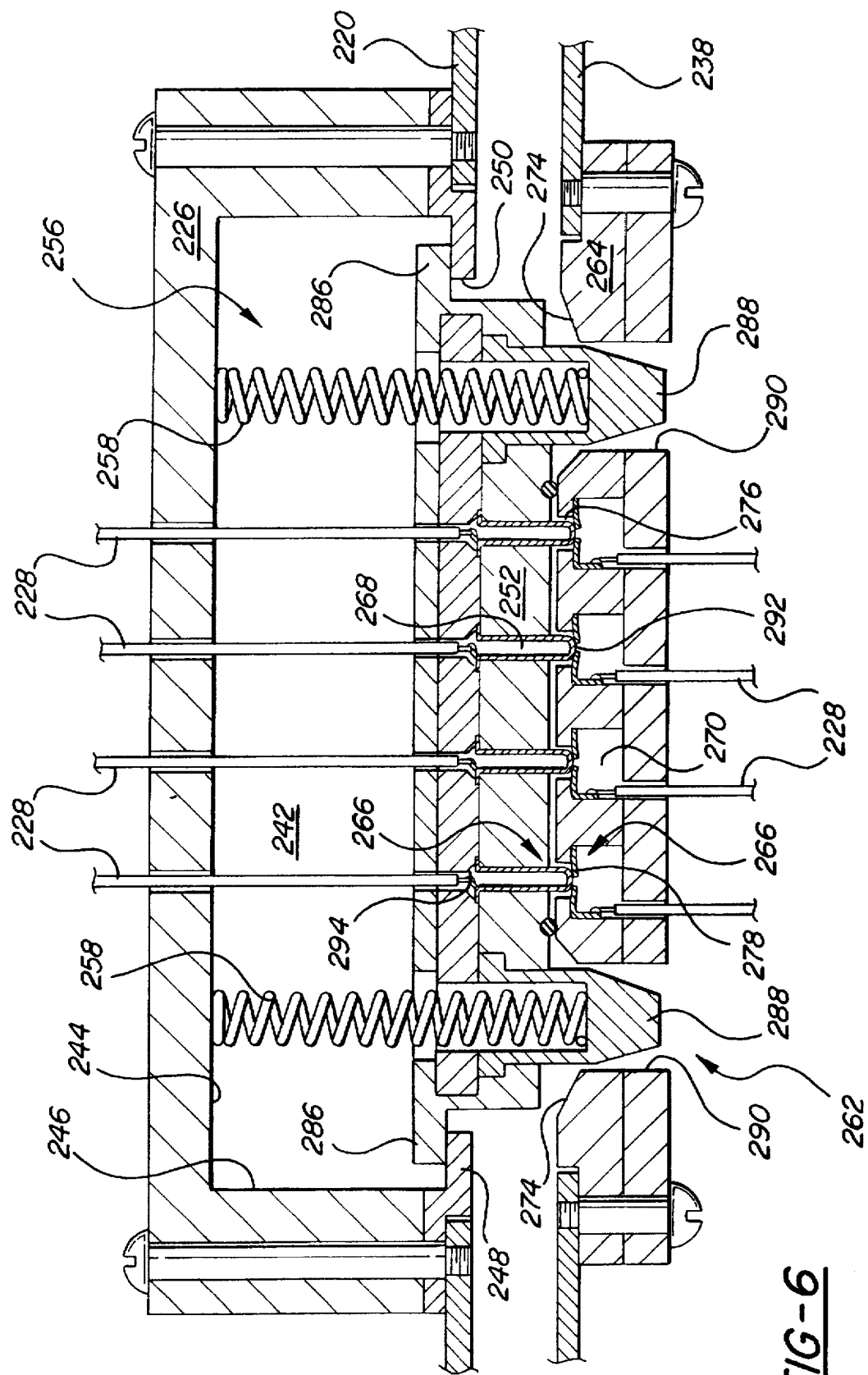
FIG. 6 is a partial cross-sectional view of another alternative embodiment of the first and second boxes.

Another alternative embodiment is shown in FIG. 6 wherein like numerals increased by two hundred indicate like or corresponding parts. A first electrical connector box 226 includes an interior chamber 242 defined by the first box 226. The chamber 242 has a top surface 244 and a plurality of side walls 246 extending from the top surface 244 to an inwardly projecting flange 248 wherein the distal end of the flange 248 defines the circumference of an opening 250. A mounting plate 252 is partially disposed within the chamber 242 and supported for limited floating movement within the chamber 242 of the first box 226. A ridge 286 extends from the top of the mounting plate 252 and engages the flanges 248 of the first box 226 wherein the remainder of the mounting plate 252 protrudes through the opening 250.

A guide member, generally shown at 262, is included for guiding the first box 226 into alignment with a complementary second electrical connector box 264 on a tunnel section 238 of the vehicle floor pan 40, which in turn establishes an electrical connection with the electrically operated component 22 within the vehicle. During installation, the guide member 262 moves the mounting plate 252 laterally for alignment with the second box 264 on the vehicle.

A plurality of hollow posts 288 extend from the mounting plate 152 wherein the posts 288 define the guide member 262. The posts 288 do not have any electrical characteristics and taper at their distal end thereof. A plurality of resilient elements, generally depicted at 256, supports the mounting plate 252 in the first box 226 for both lateral and in and out movement relative to the first box 226. Specifically, the resilient elements 256 are coiled springs 258 that are disposed within the posts 288 for supporting the mounting plate 252. The resilient elements 256, however, can be of any configuration or design so long as the mounting plate 252 is continuously biased toward the opening 250 within the first box 226. A number of holes 290 are defined within the second box 264 wherein each post 288 extends outwardly beyond the mounting plate 252 of the first box 226 and engages the corresponding hole 290 in the second box 264. Each of the holes 290 includes a chamfer 274 extending downwardly thereto. The chamfers 274 located around the perimeter of the holes 290 are larger and have a shallower slope than the chamfers 274 located on the inside surface of the holes 290. The chamfers 274 facilitate the self-aligning feature.

The first box 226 also comprises of a plurality of electrical connectors, generally depicted at 266. The connectors 266 comprise at least one male 268 and female 270 element of smaller diameters than the posts 288. More specifically, the male elements 268 are hollow pins 268 having curved front surfaces 292 and the female elements 270 are cylindrical recessed cavities 270. The pins 268 are encased within the mounting plate 252 of the first box 226 and the recessed cavities 270 are encased within the second box 264. A small circular cylinder 276, which defines the circumference of each recessed cavity 270, is located above a bendable contact plate 278. The circular cylinders 276 facilitate the self-docking feature and have a diameter slightly larger than the diameter of the pins 268. During installation, the posts 288 slide along the chamfers 274 as the seat assembly 10 is being positioned. The posts 288 then slide down the chamfers 274 and fall within the holes 290 in the second box 264. Simultaneously, the pins 268 are aligned with the circular cylinders 276 of the recessed cavity 270 wherein the pins 268 extend into the circular cylinders 276 and the curved front surfaces 292 electrically engage the contact plates 278.

The contact plates 278 and the pins 268 are electrical conducting elements that each has a corresponding lead wire 228 extending therefrom. A plurality of parabolic channels 294 are disposed above each corresponding pin 268 within the mounting plate 252. These channels 294 create an inner cavity for the lead wires 228 to tap into the pins 268. The lead wires 228 extending from the contact plates 278 are connected to an electrical power source (not shown) and the lead wires 228 extending from the pins 268 are connected to the electrically operated component 22. Note that this arrangement could be reversed with the contact plates 278 connected to the electrically operated component 22 and the pins 268 connected to the electrical power source. However, as discussed above, the preferred design for electrical connection has the power source connected to the female element 270 or contact plate 278, and the load or electrically operated component 22 is connected to the male element 268 or pins 268. This design prevents any inadvertent short circuit during installation. As discussed above and shown in FIGS. 2, 7, 8, and 9 the male 268 and female 270 elements can be arranged in any fashion.

As depicted in FIG. 6, the posts 268 are attached to the mounting plate 252 outside the male 268 and female 270 elements. An annular seal 260 surrounds the elements 268 of the first box 226 and the elements 270 of the second box 264 for providing sealing engagement between the first 226 and second 264 boxes. Accordingly, the seal 260 is disposed between the posts 288 and the elements 268, 270.

The pins 268 disclosed in this embodiment are thinner and longer than the pins 68, 168 disclosed in FIGS. 3, 4, and 5. These smaller pins 268 can be grouped in greater numbers which create a greater density of elements 268, 270. As appreciated by those skilled in the art, a key factor that controls the magnitude of an electrical current is the amount of contact area between the pins and contact plates. Accordingly, the pins 68, 168 disclosed in FIGS. 3, 4, and 5 are of greater surface area which affords them a greater contact area and allows a greater current to pass therethrough. The pins 268 disclosed in FIG. 6 have a smaller surface area which reduces the contact area and lowers the magnitude of the current that can pass therethrough. Hence, these different embodiments will be used for different applications. For example, an electrically operated component 22 that has a large number of input wires 24 and requires a relatively low current would utilize the pin design disclosed in FIG. 6. Note that the different pin designs could be utilized in conjunction with each other wherein larger solid pins and smaller hollow pins are mounted to the same mounting plate.

Figure 10:
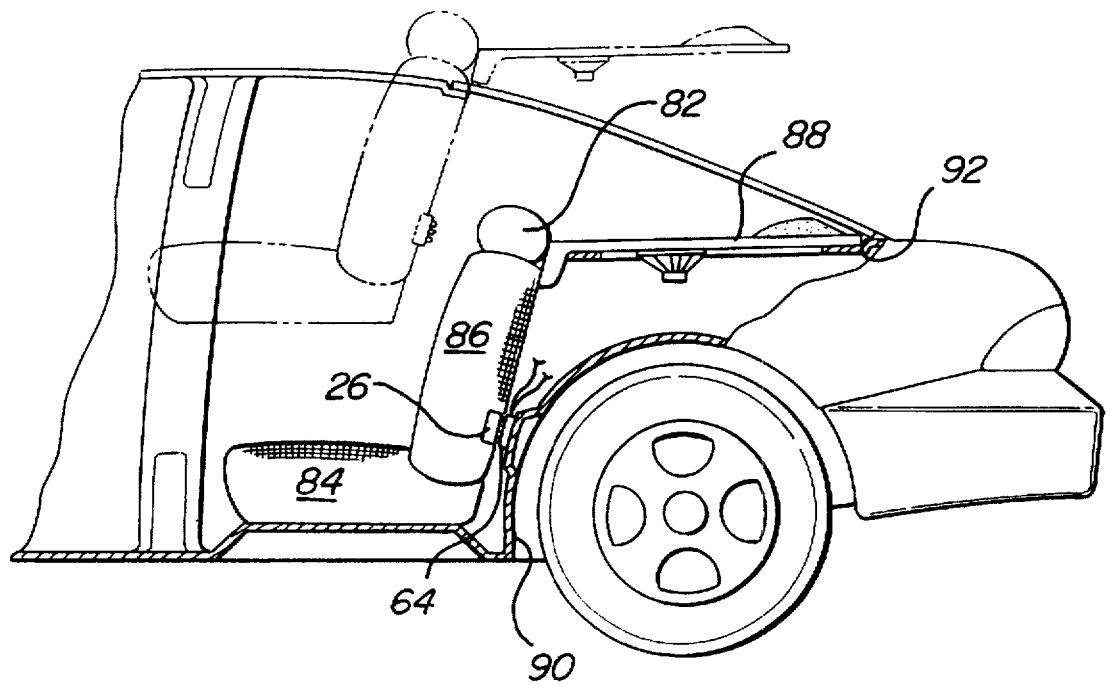
FIG. 10 is a partial cross-sectional view of an alternative embodiment showing a rear seat assembly incorporating the first and second boxes.
Figure 11:
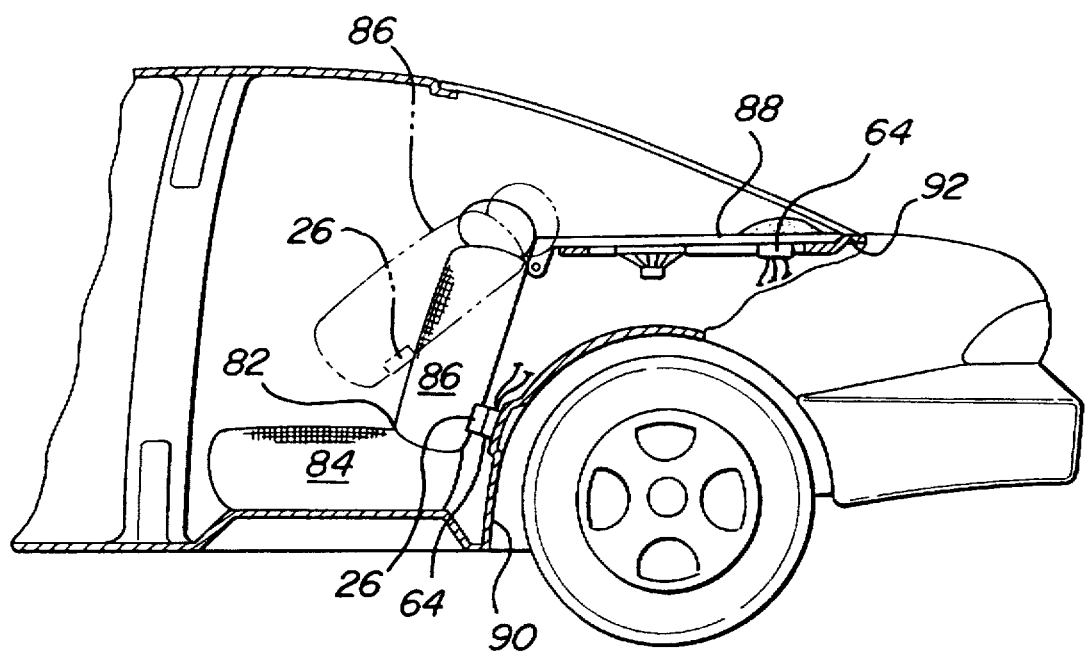
FIG. 11 is a partial cross-sectional view of another alternative embodiment showing the rear seat assembly incorporating the first and second boxes.

FIGS. 10 and 11 disclose an alternative embodiment wherein an automotive rear seat assembly 82 comprising a seat bottom 84, a seat back 86, and a package tray 88 all utilize the common frame member (not shown). The frame member disclosed in FIGS. 10 and 11 is an automotive seat frame known to those skilled in the art. At least one electrically operated component 22 is supported by the seat frame. Electrically operated components 22 commonly found within rear seat assemblies 82 may include audio speakers, audio headphone jacks, rear tail lights, seat adjustment mechanisms, lumbar support mechanisms, headrest adjustment mechanisms, a seat bottom heating mechanism, or other similar devices. The first electrical connector box 26 is secured to the seat frame with the electrically operated component 22 connected thereto. The seat frame and first box 26 are in turn attached to a support structure. The support structure shown in FIGS. 10 and 11 is comprised of a wheel well 90 and a trunk sill 92. As shown in FIG. 10, the complementary second electrical connector box 64 is mounted to the wheel well 90. Hence, during installation of the rear seat assembly 82, the first box 26 automatically aligns with the second box 64 to form an electrical connection with the electrically operated component 22. As shown in FIG. 11, complementary second electrical connector boxes 64 are mounted to both the wheel well 90 and the trunk sill 92. During installation, the first box 26 on the package tray 88 automatically aligns with the second box 64 on the trunk sill 92 to form the electrical connection. Then the seat back 86 is pivoted downwardly wherein the first box 26 on the seat back 86 automatically aligns with the second box 64 on the wheel well 90 which forms an additional electrical connection.

Figure 12:
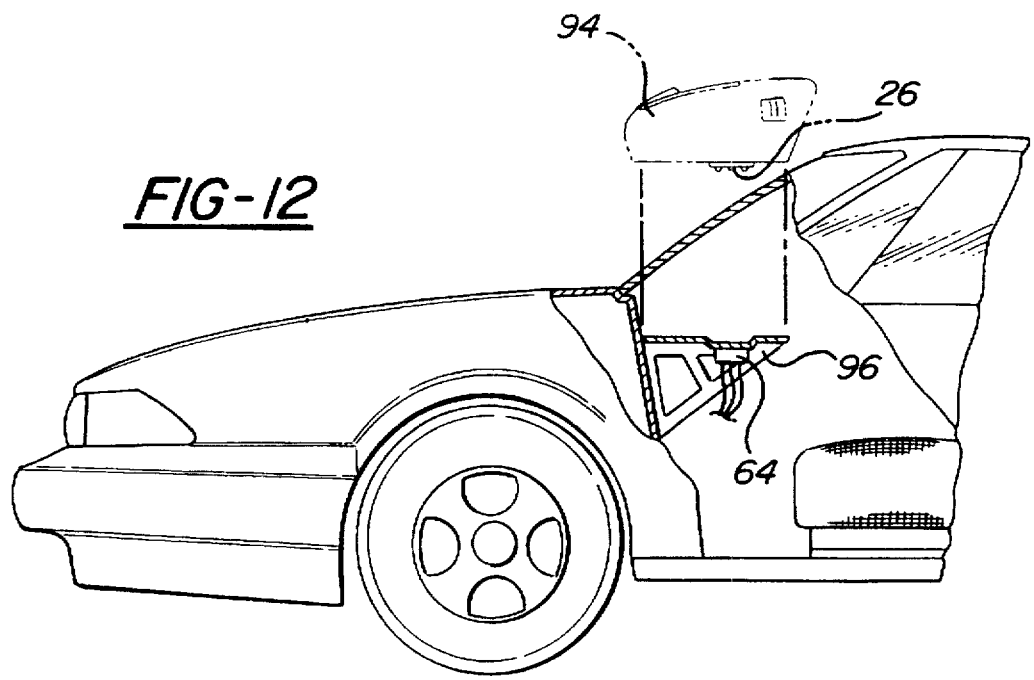
FIG. 12 is a partial cross-sectional view of an alternative embodiment showing an instrument panel incorporating the first and second boxes.

FIG. 12 discloses an alternative embodiment wherein an automotive instrument panel 94 incorporates the first electrical connector box 26. At least one electrically operated component 22 is supported by the instrument panel 94. Electrically operated components 22 commonly found within instrument panels 94 may include audio speakers, audio receivers, air bag assemblies, instrument lights, clocks or other similar devices. Each electrically operated component 22 is connected to the first box 26. The instrument panel 94 and first box 26 are in turn attached to a support structure. The support structure shown in FIG. 12 is an interior vehicle frame 96 which has the complementary second electrical connector box 64 mounted thereto. Hence, during installation of the instrument panel 94, the first box 26 automatically aligns with the second box 64 to form an electrical connection with the electrically operated component(s) 22.

Figure 13:
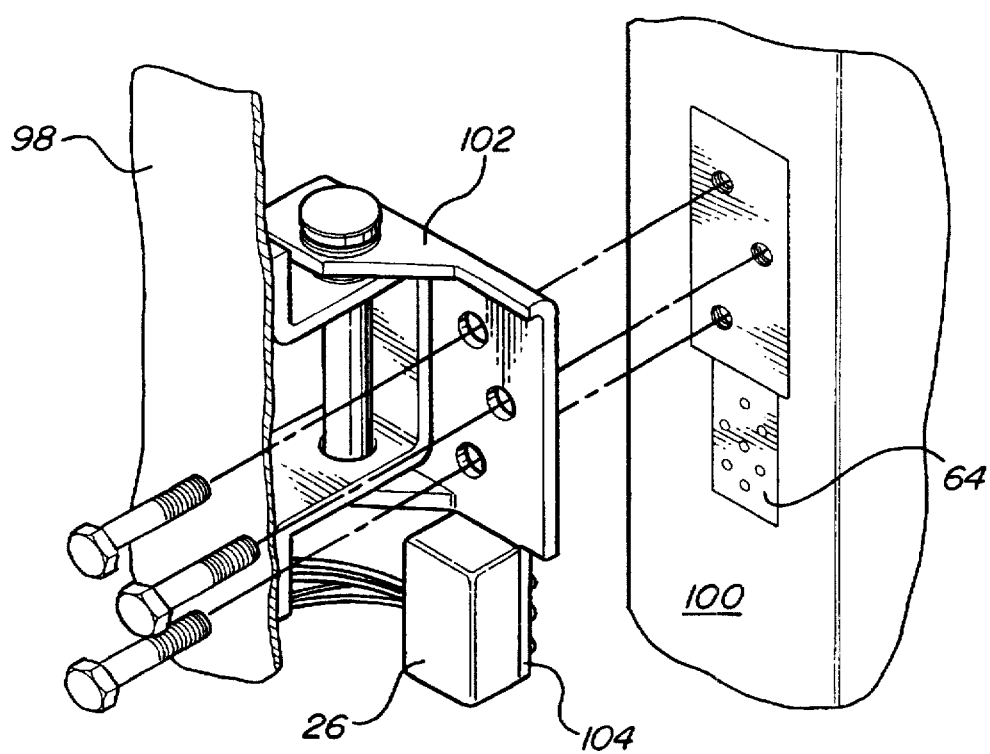
FIG. 13 is a partially exploded perspective view of an alternative embodiment showing an automotive door assembly incorporating the first and second boxes.

FIG. 13 discloses an alternative embodiment wherein an automotive door assembly 98 incorporates the first electrical connector box 26. At least one electrically operated component 22 is supported by the door assembly 98. Electrically operated components 22 commonly found within door assemblies 98 may include audio speakers, window actuators, door locks, remote entry mechanisms, or other similar devices. Each electrically operated component 22 is connected to the first box 26. The door assembly 98 and first box 26 are in turn attached to a support structure. The support structure shown in FIG. 13 is an interior door jam 100 which has the complementary second electrical connector box 64 mounted thereto. The first box 26 is mounted to a door hinge 102 via a bracket 104. Hence, during installation of the door assembly 98, the hinge 102 is bolted to the door jam 100 wherein the first box 26 automatically aligns with the second box 64 to form an electrical connection with the electrically operated component(s) 22.

Figure 14:
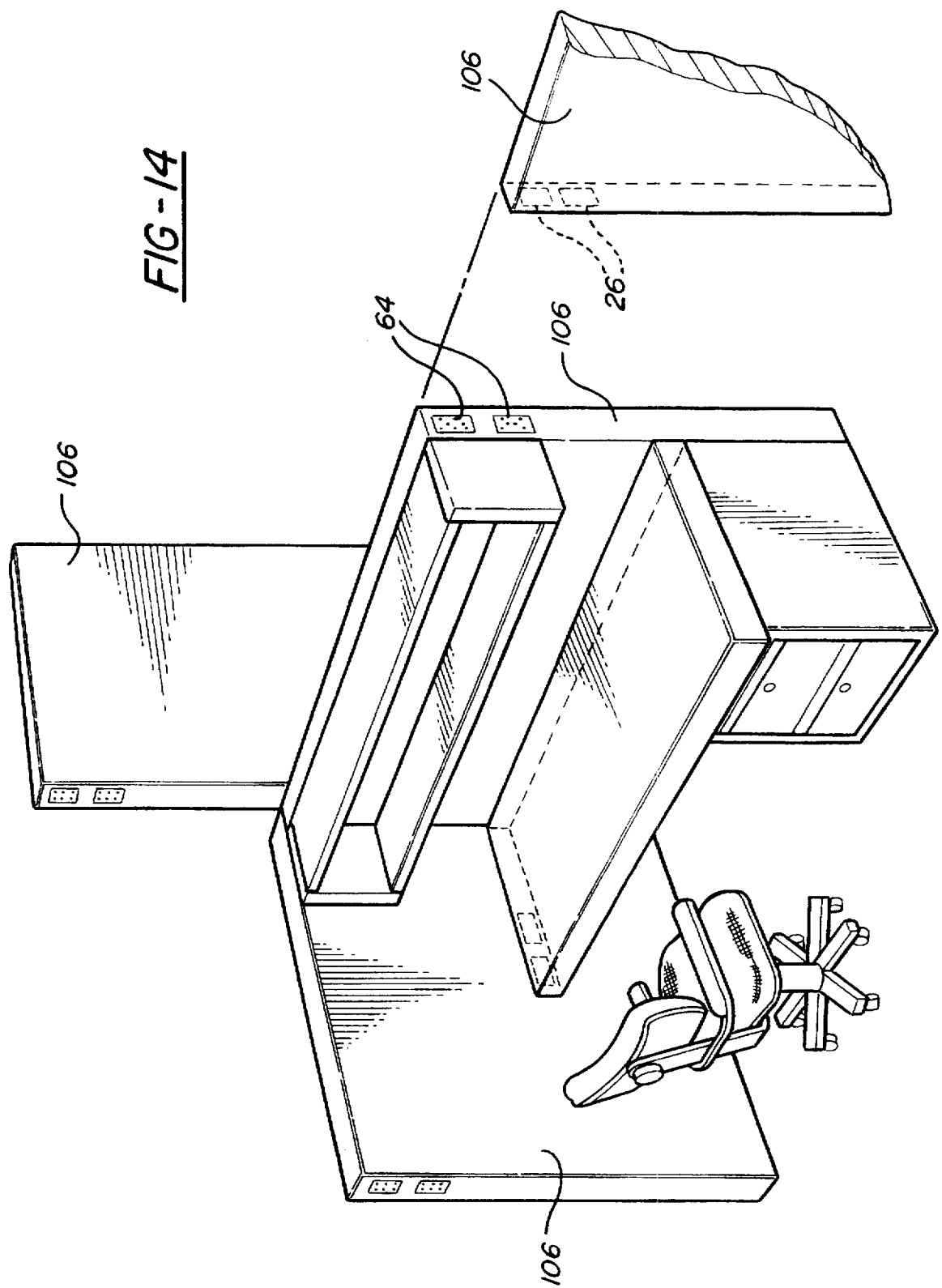
FIG. 14 is a perspective view of an alternative embodiment showing modular office furniture incorporating the first and second boxes.

FIG. 14 discloses an alternative embodiment wherein numerous parts of a modular office cubicle 106 incorporate the first electrical connector box 26 and the complimentary second electrical connector box 64. At least one electrically operated component 22 is supported by the office cubicle 106. Electrically operated components 22 commonly found within modular office cubicles 106 may include audio speakers, lights, electrical power plugs, clocks or other similar devices. The first electrical connector box 26 is secured to one part of the modular office cubicle 106 with the electrically operated component 22 connected thereto. The second box 64 is attached to a support structure or second part of the modular office cubicle 106. During installation of the modular office cubicle 106, the first box 26 automatically aligns with the second box 64 to form an electrical connection with the electrically operated component(s) 22.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A self-aligning and self-docking electrical connector assembly comprising in combination with a frame member having at least one electrically operated component;

a first electrical connector box secured to said frame member, said electrically operated component electrically connected to said first box, said first box including a mounting plate supported for limited floating movement within said first box and at least one electrical connector disposed within said mounting plate, at least one resilient element supporting said mounting plate in said first box, a second electrical connector box complementary to said first box, having at least one electrical connector and mounted on a support structure, a guide member comprising at least one post extending from said mounting plate for guiding said first box into alignment with said complementary second electrical connector box on said support structure for establishing an electrical connection with the electrically operated component, and said resilient element disposed within said post for supporting said mounting plate in said first box for both lateral and up and down movement relative to said first box.

2. An assembly as set forth in claim 1 wherein said posts are attached to said mounting plate outside said electrical connectors.

3. An assembly as set forth in claim 2 including chamfered holes defined within said second box wherein said posts extend outwardly beyond said elements of said first box and engage said holes in said second box.

4. An assembly as set forth in claim 1 wherein said mounting plate extends outside of said first box.

5. An assembly as set forth in claim 1 wherein said female elements are cylindrical recessed cavities, said male elements being hollow pins having cured front surfaces, said pins being encased within said mounting plate of said first box, and said recessed cavities being encased within said second box, said recessed cavities and said pins having lead wires extending therefrom.

6. An assembly as set forth in claim 5 wherein said mounting plate includes a plurality of parabolic channels disposed above each corresponding pin.

7. An electrical connector assembly comprising:

a first electrical connector box connected to a first electrical device, an interior chamber defined by said first box, said chamber having a top surface and a plurality of side walls, said side walls defining the circumference of an opening, a mounting plate disposed within said chamber of said first box, said mounting plate being smaller than said chamber for creating a space between said mounting plate and said top surface and side walls of said chamber, a plurality of first electrical connectors encased within said mounting plate, a second electrical connector box connected to a second electrical device, a plurality of second electrical connectors encased within said second box, and at least one resilient element supporting said mounting plate and biasing said mounting plate within said chamber of said first box toward said opening for providing continuous lateral and up and down movement of said mounting plate within said space of said chamber when said first electrical connectors engage said second electrical connectors and when said first box abuts said second box.

8. An assembly as set forth in claim 7 including a flange extending from said sidewalls inwardly toward said chamber for defining the circumference of said opening.

9. An assembly as set forth in claim 8 wherein said resilient element includes a coiled spring located within said first box or said mounting plate and adapted to be loaded in compression between said first box and said mounting plate during and after assembly with said second box.

10. An assembly as set forth in claim 8 including a guide member for guiding said first electrical connector box into alignment with said complementary second electrical connector box on said support structure for establishing an electrical connection with the first and second electrical devices.

11. An assembly as set forth in claim 10 wherein said corresponding first and second electrical connectors comprise at least one corresponding male and female element.

12. An assembly as set forth in claim 11 wherein said male and female elements define said guide member.

13. An assembly as set forth in claim 12 wherein said female elements are cylindrical recessed cavities, said recessed cavities including a cylindrical chamfer extending downwardly thereto for assisting in locating and aligning said male elements and said first box to accommodate manufacturing and assembly tolerances, and wherein said male elements are pins having parabolic front surfaces to assist in the self-alignment during assembly.

14. An assembly as set forth in claim 13 wherein said elements are offset from one another in a transverse direction.

15. An assembly as set forth in claim 14 wherein said elements are arranged in at lease two offset rows.

16. An assembly as set forth in claim 13 wherein said pins are encased within said mounting plate of said first box and said recessed cavities are encased within said second box.

17. An assembly as set forth in claim 16 including electrical taps extending into said mounting plate and abutting said pins, said recessed cavities, said pins, and said taps being electrical conducting elements, and said recessed cavities and said taps have lead wires extending therefrom.

18. An assembly as set forth in claim 17 wherein said first box includes a biasing plate slidably engaging said mounting plate for supporting said mounting plate in said first box.

19. An assembly as set forth in claim 18 including a plurality of recessed cavities located within said first box and said biasing plate for supporting and retaining said resilient element.

20. An assembly as set forth in claim 19 including apertures defined within said biasing plate wherein said lead wires extend through said apertures in said biasing plate, said mounting plate slides along said biasing plate having a range equal to the diameter of said apertures located within said biasing plate.

21. An automotive seat assembly comprising:

a seat frame, at least one electrically operated component supported by said seat frame, a first electrical connector box secured to said seat frame, said electrically operated component electrically connected to said first box, an interior chamber defined by said first box, said chamber having a top surface and a plurality of side walls, said side walls defining the circumference of an opening, a mounting plate disposed within said chamber of said first box, said mounting plate being smaller than said chamber for creating a space between said mounting plate and said top surface and side walls of said chamber, a plurality of electrical connectors encased within said mounting plate, at least one resilient element supporting said mounting plate and biasing said mounting plate within said chamber of said first box toward said opening, and an attachment member on said seat frame for attaching said seat frame and said first box to a vehicle including a guide member for guiding said first box into alignment with a plurality of electrical connectors encased within a complementary second electrical connector box on the vehicle for establishing an electrical connection with the electrically operated component within the vehicle.

22. An assembly as set forth in claim 21 including a flange extending from said sidewalls inwardly toward said chamber for defining the circumference of said opening.

* * * * *